US011500663B1

(12) United States Patent
Gupta et al.

(10) Patent No.: US 11,500,663 B1
(45) Date of Patent: Nov. 15, 2022

(54) PREDICTIVE VIRTUAL MACHINE LAUNCH-BASED CAPACITY MANAGEMENT

(71) Applicant: Amazon Technologies, Inc., Seattle, WA (US)

(72) Inventors: Diwakar Gupta, Seattle, WA (US); Srinivasan Jagannathan, Seattle, WA (US); Bradley Joseph Gussin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 432 days.

(21) Appl. No.: 15/616,649

(22) Filed: Jun. 7, 2017

(51) Int. Cl.
  *G06F 9/455* (2018.01)
  *G06F 9/50* (2006.01)
  *G06N 5/04* (2006.01)

(52) U.S. Cl.
  CPC ........ *G06F 9/45558* (2013.01); *G06F 9/5077* (2013.01); *G06F 2009/4557* (2013.01); *G06F 2009/45562* (2013.01); *G06F 2009/45591* (2013.01); *G06F 2209/5019* (2013.01); *G06N 5/04* (2013.01)

(58) Field of Classification Search
  None
  See application file for complete search history.

(56) References Cited

U.S. PATENT DOCUMENTS

| | | | | |
|---|---|---|---|---|
| 2010/0325191 | A1* | 12/2010 | Jung | G06F 15/16 709/202 |
| 2013/0139152 | A1* | 5/2013 | Chang | G06F 9/45545 718/1 |
| 2013/0227585 | A1* | 8/2013 | Ichikawa | G06F 9/50 718/104 |
| 2013/0283273 | A1* | 10/2013 | Miyazaki | G06F 9/5077 718/1 |
| 2013/0298134 | A1* | 11/2013 | Jackson | G06F 9/505 718/104 |
| 2013/0318147 | A1* | 11/2013 | Dufrene | G06F 9/45533 709/201 |
| 2014/0372167 | A1* | 12/2014 | Hillier | G06Q 10/06315 705/7.24 |
| 2015/0067170 | A1* | 3/2015 | Zhang | H04L 47/70 709/226 |
| 2015/0067682 | A1* | 3/2015 | Calder | G06F 9/5033 718/1 |
| 2015/0106805 | A1* | 4/2015 | Melander | G06F 9/5072 718/1 |

(Continued)

OTHER PUBLICATIONS

Ogawa, Yukio et al. "Cloud bursting approach based on predicting requests for business-critical web systems." Jan. 26, 2017. 2017 International Conference on Computing, Networking and Communications (ICNC). IEEE,. (Year: 2017).*

(Continued)

*Primary Examiner* — Qing Yuan Wu
(74) *Attorney, Agent, or Firm* — Lee & Hayes, P.C.

(57) ABSTRACT

A host computer inventory system within a provider network detects patterns of launch requests on an individual user account basis. For a customer that cyclically submits similar launch requests, the inventory system may allocate slots in specific host computers consistent with the detected launch pattern so that future attempts to launch the virtual machines will be honored using the pre-allocated hosts.

20 Claims, 4 Drawing Sheets

(56) References Cited

U.S. PATENT DOCUMENTS

| | | | | |
|---|---|---|---|---|
| 2015/0317081 A1* | 11/2015 | Singh | ................... | G06F 9/48 |
| | | | | 711/114 |
| 2015/0347264 A1* | 12/2015 | Mohammed | ........ | G06F 11/3476 |
| | | | | 714/45 |
| 2016/0055028 A1* | 2/2016 | DeJana | ................. | G06F 9/5077 |
| | | | | 718/1 |
| 2016/0147552 A1* | 5/2016 | Zhang | ................. | G06F 9/45558 |
| | | | | 718/1 |
| 2016/0162308 A1* | 6/2016 | Chen | ................. | G06F 9/45533 |
| | | | | 718/1 |
| 2018/0129524 A1* | 5/2018 | Bryant | ................. | G06F 9/45558 |

OTHER PUBLICATIONS

Lu, Xiaoyi, et al. "Vega LingCloud: a resource single leasing point system to support heterogeneous application modes on shared infrastructure." May 26, 2011. IEEE Ninth International Symposium on Parallel and Distributed Processing with Applications. (Year: 2011).*

* cited by examiner

140

| Time Stamp 141 | No. of VMs 142 | Type 143 | Account ID 144 | Location Criteria 145 |
|---|---|---|---|---|
| 4/13/2017 5:02 pm | 5 | xyz | abcd123 | Different racks |
| ⋮ | ⋮ | ⋮ | ⋮ | ⋮ |
| 4/20/2017 5:10 pm | 6 | xyz | abcd123 | Different racks |
| ⋮ | ⋮ | ⋮ | ⋮ | ⋮ |
| 4/27/2017 5:00 pm | 6 | xyz | abcd123 | Different racks |

FIG.2

PREDICTIVE VIRTUAL MACHINE LAUNCH-BASED CAPACITY MANAGEMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Some data centers permit users to submit requests for the creation of virtual machines. In response, a determination is made whether sufficient hardware resources are available to honor the virtual machine creation request. If sufficient resources are available, then one or more host computers within the data center are selected on which to execute virtual machines for the user in accordance with any specific requirements included in the creation request. However, if sufficient resources are not available, then the user's creation request will not be honored and an error message may be returned to the user informing him or her of this unfortunate occurrence.

BRIEF DESCRIPTION OF THE DRAWINGS

For a detailed description of various examples, reference will now be made to the accompanying drawings in which:

FIG. 2 shows an example of records in a history database from which a user account virtual machine prediction can be made in accordance with various examples;

DETAILED DESCRIPTION

Figure 1:
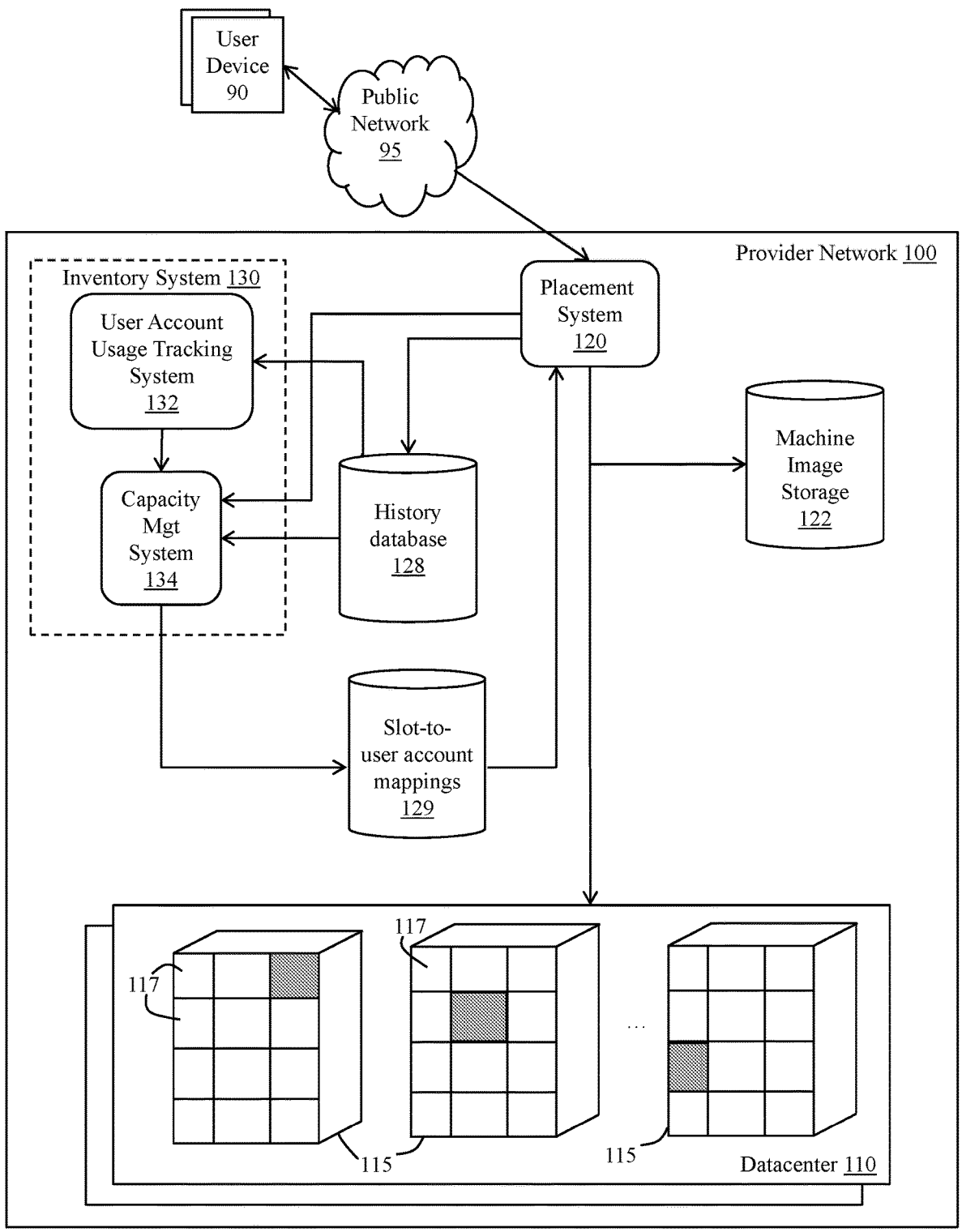
FIG. 1 shows a system in accordance with various examples for allocating host computers to individual user accounts based on a prediction of future usage of virtual machines by individual user accounts.

The disclosed embodiments are directed to a provider network that permits users to submit requests for the creation of virtual machines. The requests are referred to herein as "launch requests." Each launch request may specify various parameters about the desired virtual machines such as the number of virtual machines to be launched, the type of virtual machines, the type of operating system and other software to be included in the virtual machine, etc. In response to receipt of a launch request, a virtual machine placement service within the provider network selects one or more host computers (also called "hosts") and causes the desired virtual machines to be created on the selected hosts. Users can submit launch requests for new virtual machines, termination requests to terminate existing virtual machines, and other types of management requests.

Individuals or organizations can register themselves with the provider network to create user accounts. Access credentials (e.g. passwords, biometrics, etc.) are assigned to, or otherwise created for, each user account. Within a given user account, a user can submit virtual machine launch requests, requests to terminate the virtual machines, requests for other provider network-hosted services, etc. Some individuals or organizations may register multiple user accounts and all such accounts are linked to the common account owner. For example, the accounting and research and development departments at a particular company may have separate provider network user accounts, and both accounts are linked to the same organization.

A computer-implemented inventory system is included within the provider network and functions to predict future virtual machine needs for individual user accounts. In one example, the inventory system monitors the virtual machine creations for each user account. For each launch request that is submitted from a given user account, a database records various launch parameters such as an identifier of the user account, the number of virtual machines requested, the type of virtual machine, a timestamp (e.g., when the launch request was submitted), etc. Based on that historical virtual machine launch information, the inventory system generates a virtual machine usage prediction for each of the user accounts. Each usage prediction may comprise an indication as to when a user of particular user account is likely to generate a new virtual machine launch request in the future and the number of virtual machines likely to be requested. For example, the virtual machine launch history for a given user account may show that a user of the account launches 10 new virtual machines every Thursday at approximately 5 pm. Based on that usage pattern, the inventory system may determine that a user of the account is likely to request 10 virtual machines every Thursday at 5 pm. In response to the virtual machine usage prediction, the inventory system may create an allocation of slots in specific host computers within the provider network to the user account. The term "slot" refers to the resources (processors, memory, network ports, etc.) that are allocated to a specific virtual machine in a physical host computer. A given host computer may have one or more slots. For example, a host may be capable of executing four virtual machines and thus that host is said to have four slots. In the example above, the allocation may comprise 10 host slots that are allocated for use by the user account at 5 pm every Thursday in anticipation of one or more launch requests for virtual machines from that user account. The slots may be allocated to the user account for a temporary period of time (e.g., 15 minutes, 30 minutes, 1 hour, etc.), and if no launch requests are received for that particular user account within that specific time period, then the logical allocation of the slots to the user account is invalidated so that the slots in the hosts can be readily used for other users and user accounts.

When a user, from a user account, submits a launch request to the provider network, a virtual machine placement service determines whether a slot (or multiple slots) has already been allocated for use by that particular user account. If a slot has already been allocated for the user account that otherwise satisfies the parameters of the launch request, the virtual machine placement service creates, or causes to be created, the requested virtual machine in that particular slot. On the other hand, if a slot has not already been allocated for the user account, the virtual machine placement service determines whether a host is available to accommodate the requested virtual machine. If such a host is available, the virtual machine placement service creates the requested virtual machine on a slot in the newly selected host.

By allocating host computers to individual user accounts based on prior virtual machine usage behavior, users of the provider network are more likely to have their launch requests honored and thus less likely to be denied due to insufficient resource capacity in the provider network. In some implementations, the host slots that are allocated to specific user accounts may be selected based on user account preferences for physical locations of the host computers used to execute the users' virtual machines. For example, within a particular user account, a user may repeatedly request virtual machines to be launched according to a detectable time-based pattern as noted above, and also that the virtual machines are to be located in the same data center, in the same hosts, in different hosts, hosts on different racks, etc. (or the user may have statically configured various location parameter settings within their account). The inventory system may allocate the slots to a user account based on the same physical location specificities.

Further still, to the extent that a user has multiple user accounts with the provider network, the inventory system may not determine that any one user account is likely to request a virtual machine within a certain date and time window, but instead may determine that there is a significant enough likelihood that at least one of the multiple user accounts will request a virtual machine with the time window. The inventory system then may create the allocation to allocate the host computer to the collection of the user accounts, not just a single account. Thus, if a launch request for a virtual machine is submitted from any of the user accounts, the placement service launches the requested virtual machine on the pre-allocated host.

FIG. 1 shows an example of a provider network in accordance with the disclosed embodiments. The provider network includes one or more data centers 110, a virtual machine placement service 120, machine image storage 122, an inventory system 130, a history database 128, and slot-to-user account mappings 129. Each data center 110 includes one or more equipment racks 115 and each equipment rack can be equipped with multiple electronic devices 117. The electronic devices may comprise any combination of host server computers, storage devices, switches, routers, etc. In the embodiments described herein, reference is made to host server computers (termed "hosts" herein), but other types of devices may be installed in the racks of the provider network. The racks supply operating power and network connectivity to the hosts within the racks. Each rack can accommodate a preconfigured number of hosts, but a rack need not be fully populated with hosts. The gray boxes in FIG. 1 represents open receptacles in the rack in which a host could be, but current is not, installed. The population of hosts in the racks may vary over time as new racks are installed and maintenance is performed on the hosts within the racks.

FIG. 1 also shows user devices 90, which can be used to access the provider network through a public network 95. The user devices 90 may comprise personal computers, smart phones, tablet devices, desktop computers, and other types of computing devices that have network connectivity. The public network 95 may comprise any combination of wireless networks, wired networks, local area networks, wide area networks, and the like. Using the user devices 90, users can submit requests for resources to the provider network 100. Examples of such user requests include launch requests for virtual machines, termination requests to terminate virtual machines, status requests to have the provider network report back the status of the user's fleet of virtual machines, etc. The requests from the user devices may be in the form of requests to specific application programming interfaces (APIs) (e.g., submitted via a command line interface or in a script file) or selections made from a graphical user interface that generates a management console on a browser executing on the user device 90.

As noted above, users can access the provider network 100 through valid user accounts. Access to a user account may comprise submission of a valid password or other credential, for example included as part of the user requests or in an initial log-on interface screen rendered on the user device. Requests submitted by a user within a given user account are tracked with an identifier of that particular user account. The identifier may comprise a number or an alpha-numeric designator. As used herein, the term "user" refers to customers of the provider network.

As noted above, users can submit launch requests for virtual machines. A launch request may specify the number (1 or more) of virtual machines that the user desires to be created on hosts, the type of virtual machine, an identifier of a machine image to use for the virtual machine, and other parameters. The virtual machine type may refer to a combination of the number of processors, the amount of memory, the number of network ports, etc. that the virtual machine should include. The machine image refers to the combination of the operating system, application software, drivers, etc. that execute within the virtual machine. The machine image storage 122 stores multiple different types of machine images. To create/launch a virtual machine on a host, the requested type of machine image is retrieved from machine image storage 122 and copied on to mass storage (hard drive, solid state storage, memory, etc.) within the host. The operating system can then be booted and the applications or other software executed to provide a functional virtual machine for use by the user.

In general, a virtual machine is a software implementation of a physical computer system. Virtual machines may provide for multiple and/or different operating system environments to run concurrently on a single host computer. In one example, multiple virtual machines of a Linux® operating system environment may execute concurrently with multiple instances of a Microsoft® Windows® operating system environment on a single physical computer. A virtual machine may interact with a hypervisor or a virtual machine monitor (or other type of virtualization system) which are programs that execute on the physical computer that allow multiple guest operating systems to share a single hardware host. Each operating system appears to have exclusive access to the host's processor, memory, and other resources. However, the hypervisor controls the host processor and resources, allocating resources that are needed to each virtual machine's operating system in turn and making sure that the guest operating systems of the virtual machines do not disrupt each other. Each virtual machine may be controlled by a respective customer of the provider network.

The placement service 120 adds records to the history database 128 for each launch request received from a user account. FIG. 2 shows an example of the records in the history database. In this example, each record includes a time stamp 141, the number 142 of virtual machines in the launch request, the type 143 of virtual machines requested, the account identifier (ID) of the user account corresponding to the launch request, and location criteria 145. The time stamp 141 may corresponding to the time at which the launch request was received by the provider network (e.g., placement service 120), the time at which the virtual machines were launched following receipt of the launch request, or at another time relevant to the virtual machine launch. The time stamp 141 may be specified in terms day and time of day. In the example of FIG. 2, one particular user account having account ID "abcd123" launched 5 xyz virtual machines on Apr. 13, 2017 (which is a Thursday) at 5:02 pm and specified a location criteria that the 5 virtual machines should be launched on different racks. Similar launch requests are included in the history database on April $20^{th}$ and again on April $27^{th}$, both Thursdays. On April $20^{th}$ and $27^{th}$, the user requested 6 virtual machines instead of 5, but the type of virtual machines requested and the location criteria were the same as for April $13^{th}$. The time stamp also is similar-5:10 pm and 5:00 pm.

The inventory system 130 in FIG. 1 retrieves and examines the records from the history database and detects cyclical virtual machine usage patterns on an individual user account basis. In the example of FIG. 2, the inventory system 130 would determine that every Thursday at around 5:00 pm user account abcd123 is likely to request 5 or 6 virtual machines of type xyz and request that those 5 or 6 virtual machines be launched in different racks. Once the inventory system 130 detects such virtual machine usage patterns, as explained below, the inventory system can create an allocation of slots in specific host computers to the user account in advance of the weekly time period in which the user is predicted to likely launch the virtual machines. Thus, when the user actually does submit the launch request for the virtual machines, the hosts to be used to execute the requested virtual machines has already been reserved for the user account and the placement service 120 need only cause the relevant machine images to be loaded on the hosts whose slots have been allocated to the user account and the virtual machines to be executed. As the slots have been pre-allocated for the user accounts (at least those user accounts that demonstrate a repetitive launch cycle as can be gleaned from the records in the history database 128), the probability is increased that the provider network will be able to honor more launch requests.

Referring still to FIG. 1, the inventory system 130 comprises a user account usage tracking system 132 and a capacity management system 134. The user account usage tracking system 132 accesses the records in the history database 128 and generates the virtual machine usage predictions. The user account usage tracking system 132 may detect cyclical launch requests from a given user account (e.g., every Thursday per the example above) and with the same or similar time of day (e.g., approximately 5 pm per the example above), same or similar number of requested virtual machines (5 and 6 in the example above) and for the virtual machine types that can be hosted on the same physical host. Some of these parameters should be the same to comprise a detected cyclical pattern. For example, the dates must be cyclical such that a future date can be predicted. Records that show a given user account has launched virtual machines every Thursday for a number of weeks in a row represents a possible cyclical pattern, but if the records shows launches of virtual machines on a Thursday, followed by the following Wednesday, followed by the following Friday, is not sufficient to predict what will happen the following week. Further, different types of virtual machines may execute on the same physical host. The account IDs should be the same to be considered a match. However, the time of day (5:02 pm, 5:10 pm, etc.) need not be exactly the same. The range of time of day may be compared to a preconfigured threshold to detect a pattern. For example, if the time of day varies from record to record by less than X minutes (X being a threshold of, for example, 15 minutes), then the time values are consider a "match." The location criteria need not match. If it does match, then the user account usage tracking system 132 may cause the common location criteria to be honored for the host allocation. If the location criteria does not match, then it may not factor into the selection of hosts to be allocated to the user account.

The virtual machine usage prediction generated by the user account usage tracking system 132 may be represented as a human-readable an alphanumeric character string that specifies that the timing periodicity (every Thursday, last Friday of every month, etc.), the time of day, the number of virtual machines, the user account and the location criteria. The prediction also may include a confidence score for the prediction as calculated by the user account usage tracking system 132. For example, a user account whose history database records show that every Thursday for the last 6 months, the user has requested 6 virtual machines at approximately 5 pm may be computed with a higher confidence score than a usage pattern based only on a pattern of weekly launch requests for a 3-week period of time. Further, for a user account that has received a higher than a threshold number of insufficient capacity errors when attempting to launch virtual machines may cause the user account usage tracking system 132 to compute an elevated confidence score value in an attempt to help ensure that particular user is able to create virtual machines in the future.

The virtual machine usage predictions are provided from the user account usage tracking system 132 to the capacity management system 134. The capacity management system 134 assesses the host capacity in the provider network. The records of the history database 128 and other databases can be accessed by the capacity management system 134 to determine how many and which hosts are actively executing virtual machines. To the extent hosts are able to execute multiple virtual machines concurrently, the capacity management 134 determines which hosts are executing virtual machines, the number of available slots in the hosts, and thus the number of virtual machines that can still be created on those hosts. Each time a slot in a host is selected by the placement service 120 to execute a virtual machine, the placement service may update an inventory record in a database (e.g., the history database 128 or another database) and the capacity management service 134 accesses that database to make the inventory determinations.

Additional inputs to the capacity management system 134 may include planned outages and identifiers of newly installed hosts. An example of a planned outage is that a room of a data center may be powered down for maintenance at a certain day and time (or an individual rack or an individual host is to be powered down), and thus all of the hosts in that room will be offline during that maintenance period. If additional hosts are installed in the racks 115 of a data center 110, unique identifiers of those hosts may be registered with the capacity management system 134. Additional inputs may be provided to the capacity management system 134 as well that is indicative of the state of the provider network's fleet of hosts.

The capacity management system 134 receives the virtual machine predictions from the user account usage tracking system 132. Based on the predictions from the use account usage tracking system, as well as its general awareness of the state of the fleet of the hosts, planned outages, and other factors, the capacity management system 134 determines whether to create an allocation of one or more slots in one or more hosts for a given user account to which a prediction is present. Continuing with the example above of a prediction that specifies every Thursday at 5 pm a certain user account will likely request 5 virtual machines of a certain type and with a certain location criteria, if the capacity management system 134 decides to create a host slot allocation for the user account, the capacity management system selects 5 hosts that have empty slots that can accommodate the specified virtual machine type and that complies with the location criteria. The selection of slots in hosts may comply with any location criteria that has been recorded with the prediction. Further still, if needed, the capacity management system 134 may cause a live migration to be performed to move a virtual machine from a first host to a second host to thereby free up a slot in the first host to allocate to a user account in accordance with a virtual machine usage prediction. In some embodiments, as a result of the virtual machine predictions, the capacity management system 134 (or another system) may reconfigure servers to execute different types of virtual machines. For example, if the predictions are such that servers will be needed that can execute a particular type or class of virtual machines, but an insufficient number of such servers and slots will be available at the time period associated with the prediction, the capacity management system 134 may reconfigure, or initiate the reconfiguring of, servers that execute other types of virtual machines to be able to execute the type of virtual machines consistent with the prediction. Reconfiguring a server may include hardware changes to the server (e.g., installing more memory in the server, activating or adding processor modules, etc.) and/or software changes such as loading a different type of host operating system, a different virtualization system, etc.

The capacity management system 134 also adds or updates a record in the slot-to-user account mappings 129 to reserve those specific hosts for use by the user account at the specified time period. The allocation may comprise a mapping between specific host identifiers (e.g., serial numbers, internet protocol (IP) addresses, etc.), and the user account ID.

The allocation also may include a start time and a value indicative of an end time. The start time may be the day and time included in the prediction (5 pm every Thursday in the example above). The start time may comprise a time earlier than the prediction's time value (e.g., 4:45 pm) to account for variations in when users may submit launch requests. The start time specified in the slot allocation may depend on the excess host capacity that the capacity management system 134 predicts at the virtual machine usage prediction's time based on other factors such as planned outages, general usage patterns among all of the customer accounts for the fleet of hosts, etc. For example, if the capacity management system 134 determines that at the time specified in the prediction that the fleet of hosts will likely execute enough virtual machines that less than a threshold number of additional virtual machines will be able to launch and execute at that time, the capacity management system 134 may generate the allocation to ensure that the user account corresponding to the prediction will have sufficient slots available. However, if the capacity management system 134 determines that the fleet of hosts will likely be loaded with relatively few virtual machines such that more than the threshold number of additional virtual machines can still be launched, the capacity management system may opt not to create the allocation. In this latter case, pre-allocating slots in hosts for a particular user account may not be deemed necessary to ensure host availability for that user account and, reserving the host slots would otherwise waste resources as no other user accounts could use the slots. Alternatively, rather than not creating the allocation upon determining that the fleet of hosts is likely to be widely available for executing virtual machines, the capacity management system 134 may create the allocation but set the start time later rather than earlier to reduce the amount of time that the slots are unavailable for use by other users. Upon expiration of the end time, the allocation is considered invalid and the allocated slots in the specified hosts can be used to launch virtual machines for any user accounts.

The capacity management system 134 may also take into account prior experience by the users when attempting to launch virtual machines. For example, if within a particular user account, the provider network has been unable to honor the user's launch requests more than a threshold number of times due to, for example, insufficient host availability at the time of the launch requests, the capacity management system 134 may be configured to weight the determination as to whether to create a slot-to-user account mapping 129 in favor of creating the mapping for the user upon detection of a usage pattern for that user account. As a result, those users that have been denied virtual machines in the past more than the threshold number of times may be more likely to have hosts reserved in the future in accordance with the prediction determined by the user account usage tracking system.

As explained above, the user account usage tracking system 132 may generate predictions of future virtual machine requests for individual user accounts. Alternatively or additionally, the user account usage tracking system 132 may generate a prediction for a group of user accounts. For example, an organization may have multiple user accounts with the provider network. Such user accounts may have unique IDs but be linked through a common account owner identifier. In analyzing the records of the history database, the user account usage tracking system 132 may not detect a usage pattern for an individual account with sufficient confidence to generate a prediction for the capacity management system. For example, some Thursdays at 5 pm, but not every Thursday at 5 pm, a given user account request a certain number of virtual machines. However, if the other user accounts for the common organization also periodically, but not necessarily consistently, also request virtual machines on Thursdays at 5 pm, then collectively the user account usage tracking system 132 may determine that the likelihood is sufficiently high that at least one of the user accounts will likely (probability greater than a threshold) need virtual machines Thursdays at 5 pm. As such, the user account usage tracking system 132 computes an aggregate virtual machine usage prediction for the group of user accounts. The aggregate virtual machine usage prediction may comprise the same or similar information as that described above, but also include identifiers of all of the user accounts to which the prediction pertains. The capacity management system 132 responds to the aggregate virtual machine usage prediction by determining whether to create the slot-to-user account mappings as described above. If the capacity management system 132 determines to create the mapping, the slot-to-user account mappings 129 are updated to specify the particular hosts and the corresponding user accounts.

The multiple accounts for which a virtual machine usage prediction is generated may correspond to a common account owner. In other embodiments, however, the accounts for which the prediction is generated need not be linked by a common owner or user. The accounts may have different and unrelated users.

Referring still to FIG. 1, upon receipt by the placement service 120 of a launch request, the placement service 120 access the slot-to-user account mappings 129 to determine whether a slot (or multiple slots) have already been allocated to the user account to which the launch request pertains. If a slot has already been allocated to the corresponding user account, then the placement service 120 causes the requested virtual machine(s) to be executed on the pre-allocated slots. If a slot has not already been allocated to the user account, then the placement service 120 selects a suitable slot in a host, if one is available, and causes the requested virtual machine(s) to be executed on the newly selected host.

In the embodiments described above, the slots are logically allocated to individual user accounts and the logical allocation is implemented, for example, in the slot-to-user account mappings 129. In other embodiments, the placement service 120 may launch a virtual machine on the allocated slot in anticipation of the user submitting a launch request for just such a virtual machine. Of course, if the virtual machine is not requested, the placement service 120 will terminate the virtual machine.

Figure 3:
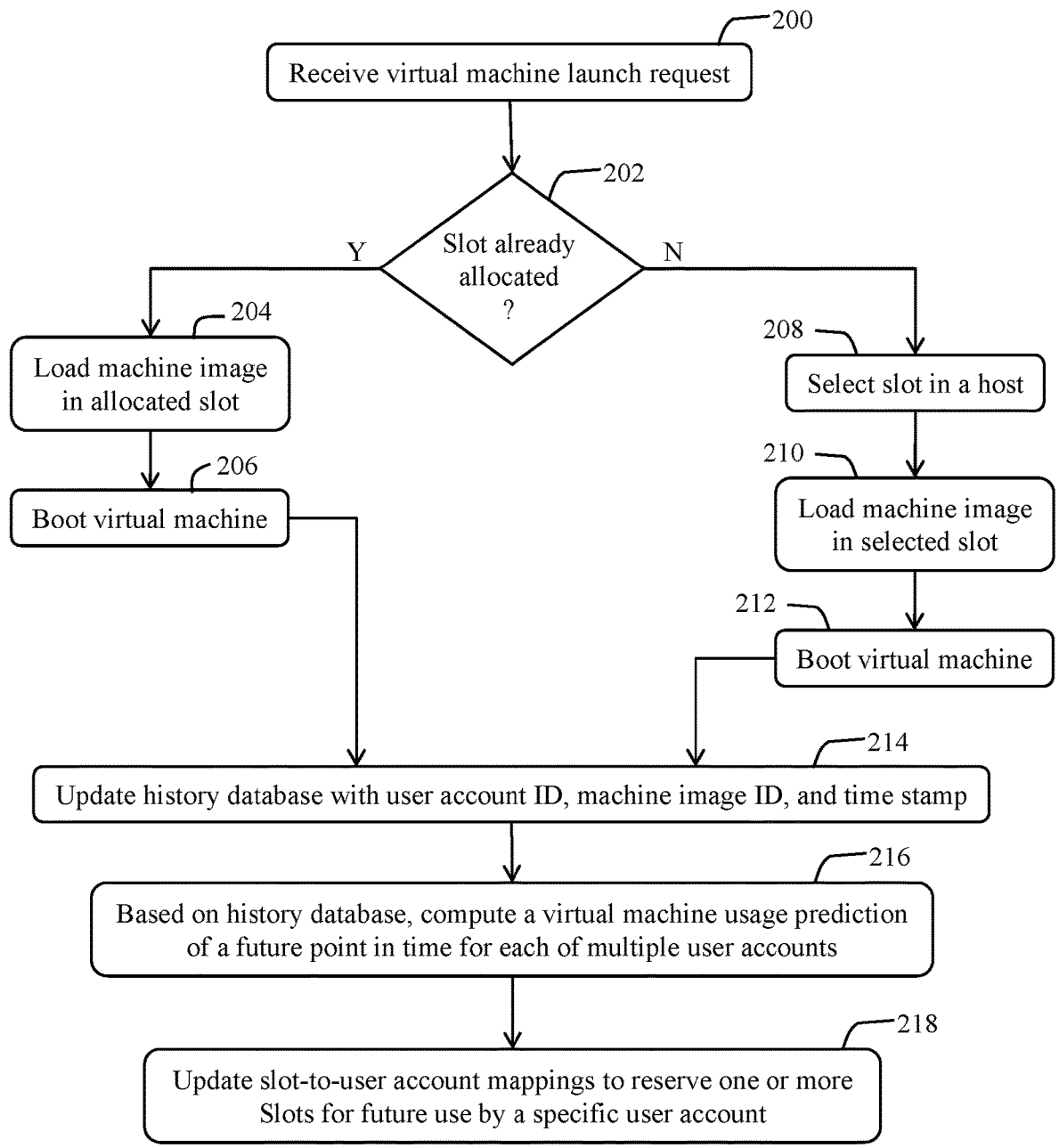
FIG. 3 shows a method flow chart in accordance with various examples.

FIG. 3 illustrates an example of a method of pre-allocating hosts to individual user accounts as explained above. The operations may be performed in the order shown, or in a different order. Further, the operations may be performed sequentially, or two or more of the operations may be performed concurrently.

At 200, the method includes receiving a virtual machine launch request. The launch request may be received by the placement service 120 from a user device 90 as an API request, or other forms. The request may include, as explained above, an identifier of the user account, the number of virtual machines requested, an identifier of a machine image to use to launch the virtual machine, and other launch parameters such as location criteria for the hosts used to execute the virtual machine(s), pricing information, etc. The launch request may include a timestamp or the placement service 120 may record the time at which launch request was received.

At 202, the method includes determining whether one or more slots have already been allocated to the user account for use consistent with the parameters of the launch request. This operation may be performed by the placement service 120 accessing the slot-to-user account mappings 129 and identifying whether a mapping exists for the particular user account and for a time period consistent with the timestamp of the launch request. The determination also may entail determining whether a mapping exists that has enough slots to accommodate the requested number of virtual machines. Even if the number of slots included in the allocation are less than the number of slots specified in the launch request, the placement service 120 still may honor the launch request with a combination of the pre-allocated hosts and, if available, additional host slots that were not pre-allocated.

If slots had been allocated for the user account, then at 204 and 206, the method includes loading suitable machine images on the allocated slots and booting the virtual machines. The machine images are identified in the launch request, and may be retrieved from machine image storage 122. The machine images may be retrieved by the host itself or pushed down to the host computer under the direction of the placement service 120. Booting the virtual machine may include booting the guest operating system of the virtual machine, loading device drivers, installing configuration parameters such as IP addresses, validation keys, encryption keys, etc.

If however, there is no corresponding slot-to-user account mapping for the user account that submitted the launch request, then at 208, the method includes determining whether suitable host computers and slots are available to honor the launch request and selecting the host computers to use to execute the requested virtual machines. The placement service 120 may perform this operation with interaction of the inventory system 130. Once the hosts and slots have been selected, then at 210 and 212, the appropriate machine images are loaded on the hosts and the virtual machines are booted as noted above.

In either case, at 214, the example method of FIG. 3 further includes updating the history database 128 with a record that specifies the identifier of the user account that provided the launch request, the number of virtual machines requested, the identifier of the requested machine image and a time stamp of the request. Based on records of the history database at 216, the method also includes computing virtual machine usage predictions for future points in time for each of multiple user accounts. This operation may be performed by the user account usage tracking system 132 and may be performed at defined intervals (e.g., every hour, once per day, etc.). At 218, the method includes updating the host-to-user account mappings 129 to reserve one or more hosts for future use by a specific user account. This operation may be performed by the capacity management system 134 as explained above.

Figure 4:
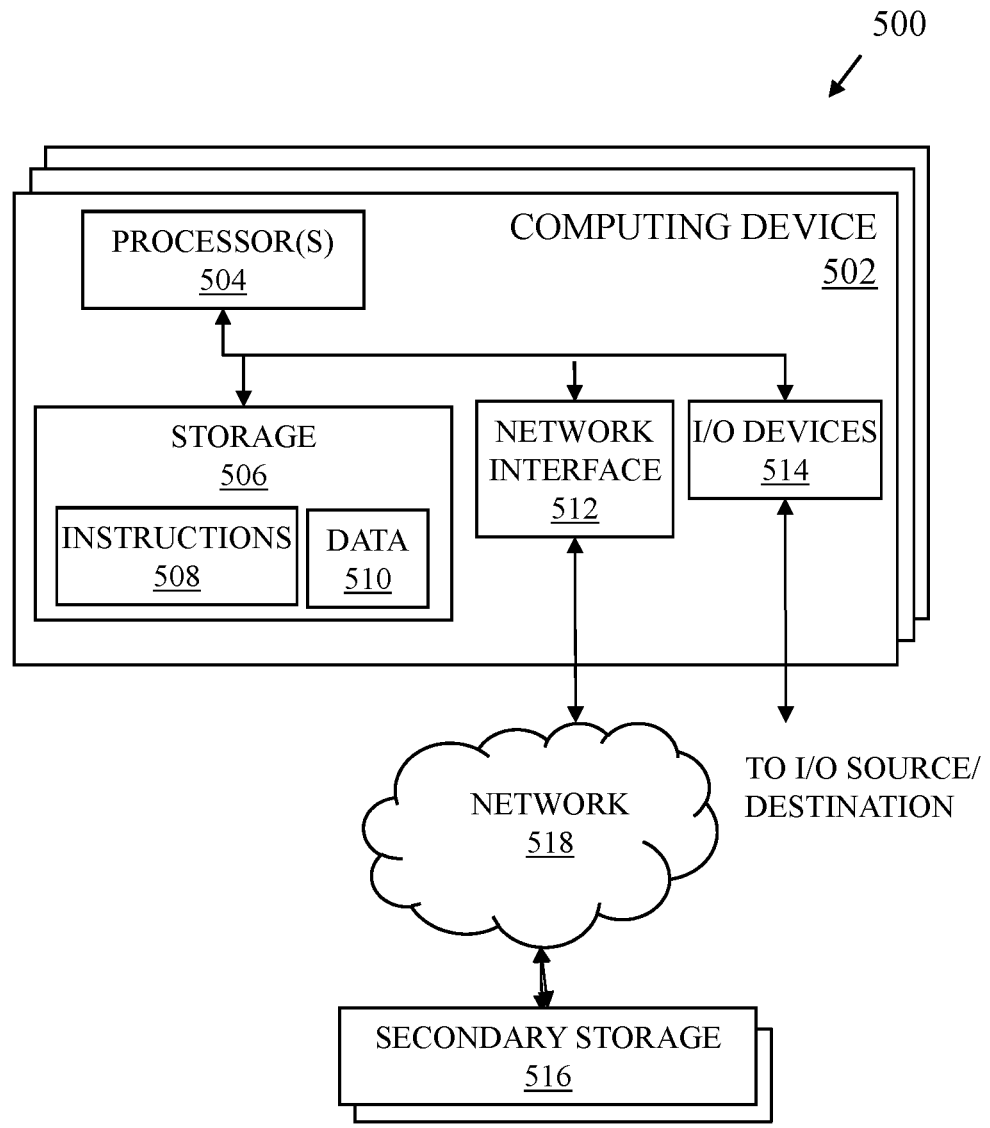
FIG. 4 depicts an example of a computing system usable to implement the disclosed embodiments.

FIG. 4 shows a schematic diagram for a computing system 500 suitable for implementation of any of the placement service 120, inventory system 130 (including the user account usage tracking system 132 and the capacity management system 134), as well as the machine image storage 122, history database 128, and host-to-user account mappings 129 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various services described herein.

Each computing device 502 includes one or more processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs. The system implements a hardware processor resource comprising one or more processors of the various computing devices that implements any or all of the placement service 120, inventory system 130 (including the user account usage tracking system 132 and the capacity management system 134), as well as the machine image storage 122, history database 128, and host-to-user account mappings 129.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the placement service 120, inventory system 130 (including the user account usage tracking system 132 and the capacity management system 134), as well as the machine image storage 122, history database 128, and host-to-user account mappings 129 and other components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
   one or more processors; and
   one or more computer-readable media storing one or more computer-executable instructions that, when executed by the one or more processors, cause the one or more processors to:
   maintain a history database containing records of at least one previous virtual machine launch request associated with a specific user account, the maintaining including storing a time stamp in association with the at least one previous virtual machine launch request and an identifier of the specific user account;
   determine that a pattern of usage of virtual machines by a group of user accounts, at previous times on previous days, meets or exceeds a preconfigured threshold;
   determine, based at least in part on the records and the pattern of usage, a predicted virtual machine launch request for the specific user account, the predicted virtual machine launch request including a predicted date and time associated with the predicted virtual machine launch, a number of virtual machines predicted to be used by the specific user account for the predicted virtual machine launch, and a time period during which the number of virtual machines are predicted to be used by the specific user account for the predicted virtual machine launch;
   reserving, based at least in part on the predicted virtual machine launch and prior to receipt of a virtual machine launch request associated with the specific user account, a slot on a specific host computer to be utilized by the specific user account for the predicted virtual machine launch request;

receive the virtual machine launch request for the specific user account; and cause, based at least in part on the virtual machine launch request, a machine image to be loaded onto the slot and a virtual machine to be launched in the slot using the machine image.

2. The system of claim 1, wherein the one or more computer-executable instructions further cause the one or more processors to compute an aggregate virtual machine usage prediction for a plurality of user accounts;

based at least in part on the aggregate virtual machine usage prediction, create an allocation of the slot in the specific host computer to the specific user account;

determine whether the slot has been allocated for use with any of the plurality of user accounts prior to receipt of the virtual machine launch request; and responsive to a determination that the slot has been allocated for use with the any of the plurality of user accounts, cause the machine image to be loaded into the slot, the virtual machine to be launched in the slot using the machine image, and assign the machine image to the specific user account corresponding to the virtual machine launch request.

3. The system of claim 1, wherein the one or more computer-executable instructions further cause the one or more processors to:

generate database update requests to create an allocation of the slot in the specific host computer, wherein each database update request includes an end time; and generate another database update request to invalidate a given allocation responsive to the virtual machine launch request not being received before the end time from the specific user account to which the given allocation corresponds.

4. The system of claim 1, wherein the history database records, for each of multiple user accounts, host computer physical location parameters and wherein the one or more computer-executable instructions further cause the one or more processors to create an allocation of a plurality of slots to the specific user account based at least in part on the predicted virtual machine launch request, wherein the allocation of the plurality of slots comprises a selection of specific host computers based at least in part on the host computer physical location parameters for the specific user account.

5. The system of claim 1, wherein the one or more computer-executable instructions further cause the one or more processors to:

compute multiple virtual machine usage predictions for the specific user account for multiple time windows, one virtual machine usage prediction for each time window of the multiple time windows; and based at least in part on the predicted virtual machine launch request for a given time window of the multiple time windows, create an allocation of a second slot of at least one specific host computer to the specific user account during the given time window.

6. The system of claim 1, wherein the slot is allocated for the specific user account for a predetermined period of time, and wherein a lack of receipt of the virtual machine launch request from the specific user account within the predetermined period of time causes invalidation of the slot for the specific user account such that the slot is available for other user accounts excluding the specific user account.

7. The system of claim 6, wherein prior to causing the machine image to be loaded into the slot, the one or more computer-executable instructions further cause the one or more processors to cause a second virtual machine to be migrated from the specific host computer to a second specific host computer different than the specific host computer, thereby causing the slot to be available for use in association with the specific user account.

8. The system of claim 1, wherein the pattern of usage of the virtual machines is further based at least in part on one or more physical locations associated with the virtual machines.

9. The system of claim 1, wherein the pattern of usage of the virtual machines indicates cyclical virtual machine launch requests from the specific user account at a same time of day at least a predetermined number of times or for a same number of requested virtual machines hosted on a same physical host at least the predetermined number of times.

10. A system, comprising:

one or more processors; and one or more computer-readable media storing one or more computer-executable instructions that, when executed by the one or more processors, cause the one or more processors to:

determine a predicted virtual machine launch request for a user account based at least in part on a pattern of usage of virtual machines by a group of user accounts;

allocate a slot of a specific host computer to the user account based at least in part on the predicted virtual machine launch request;

receive a virtual machine launch request for the user account;

determine that the slot was allocated, prior to receipt of the virtual machine launch request, to the user account; and responsive to determining that the slot has been allocated to the user account, cause a machine image to be loaded onto the specific host computer and a virtual machine to be launched on the slot using the machine image.

11. The system of claim 10, wherein the one or more computer-executable instructions further cause the one or more processors to access a database containing records of prior virtual machine launches within the user account and to compute a virtual machine usage prediction for the user account, based at least in part on the records.

12. The system of claim 10, wherein the predicted virtual machine launch request for the user account includes a number of virtual machines and a time period during which the number of virtual machines are predicted to be used by the user account.

13. The system of claim 10, wherein the predicted virtual machine launch request includes parameters indicative of a number of virtual machines, a starting time, and a value indicative of an end time, and wherein the one or more computer-executable instructions further cause the one or more processors to:

create an allocation record in a database, the allocation record including the parameters; and invalidate the allocation record at the end time.

14. The system of claim 10, wherein the one or more computer-executable instructions further cause the one or more processors to:

access a database containing history records for the user account and a plurality of other user accounts, each history record of the history records corresponding to the user account and indicating a date and timestamp for times at which virtual machines were launched within the user account; and compute a separate predicted virtual machine launch request for at least two of the plurality of the other user accounts.

15. The system of claim 14, wherein, the one or more computer-executable instructions further cause the one or more processors to compute one virtual machine usage prediction for a set of the at least two of the plurality of the other user accounts.

16. The system of claim 10, wherein the one or more computer-executable instructions further cause the one or more processors to:

receive a second virtual machine launch request for a second user account;

determine that a second slot has not been allocated, prior to receipt of the second virtual machine launch request, to the second user account; and responsive to a determination that the second slot has not been allocated to the second user account, select a host computer from within a provider network, cause a second machine image to be loaded onto the host computer, and cause a second virtual machine to be launched on the host computer using the second machine image.

17. The system of claim 10, wherein the one or more computer-executable instructions further cause the one or more processors to allocate a plurality of slots to the user account, wherein each slot of the plurality of slots is selected based at least in part on a physical location parameter included in prior virtual machine launches within the user account.

18. A computer-implemented method, comprising:

receiving, by a hardware processor resource, a virtual machine launch request within a user account;

determining, by the hardware processor resource, that a slot in a host computer has already been allocated to the user account;

using the slot in the host computer based at least in part on the virtual machine launch request, launching a virtual machine on the slot;

creating, by the hardware processor resource, a record in a history database with information about the launching of the virtual machine and an identifier of the user account;

determine, by the hardware processor resource and based at least in part on the record, a predicted virtual machine launch request at a future point in time for the user account; and updating, by the hardware processor resource, a slot-to-user account mapping to reserve one or more slots for future use by the user account based at least in part on the predicted virtual machine launch request.

19. The method of claim 18, wherein updating the slot-to-user account mapping comprises adding a second record to the history database that includes unique identifiers of one or more host computers associated with the one or more slots and the identifier of the user account.

20. The method of claim 18, wherein determining the predicted virtual machine launch request comprises detecting a launch pattern in one or more records of the history database, wherein the launch pattern comprises multiple virtual machine launches on a repeating time cycle, and wherein the multiple virtual machine launches include a common number of virtual machines to be launched.

* * * * *